Aug. 10, 1937.   W. M. UPP   2,089,512
ELECTRICAL SYSTEM FOR TRUCK REFRIGERATION AND THE LIKE
Filed May 2, 1935   2 Sheets-Sheet 1
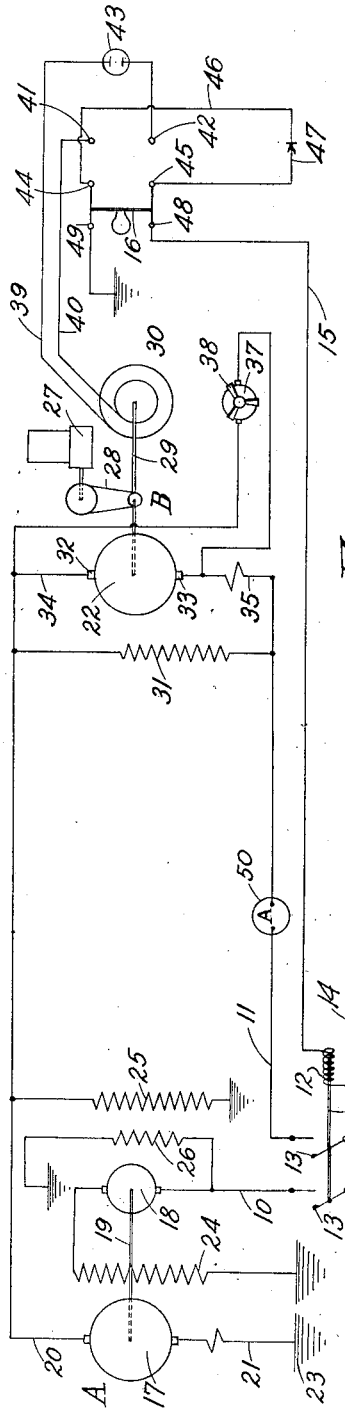
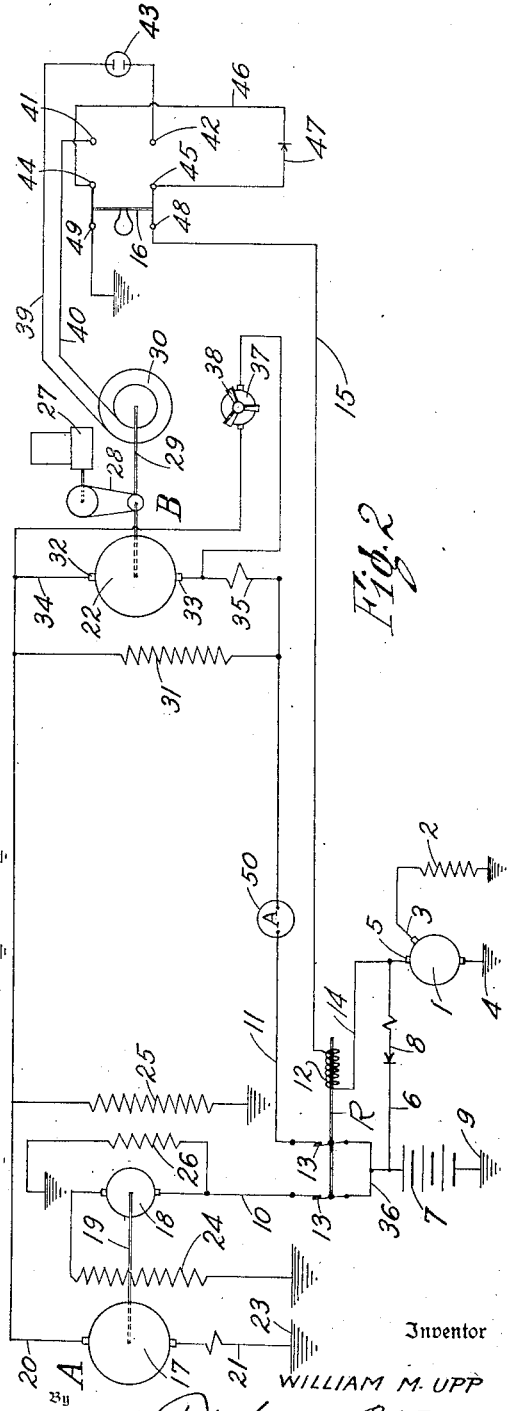
Inventor
WILLIAM M. UPP
By Richey & Watts
Attorneys

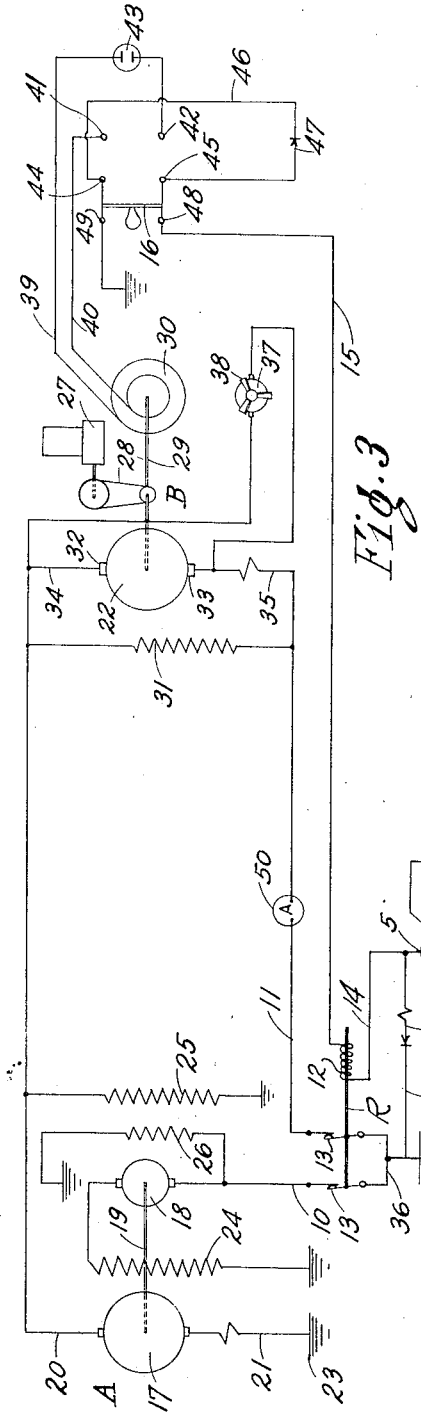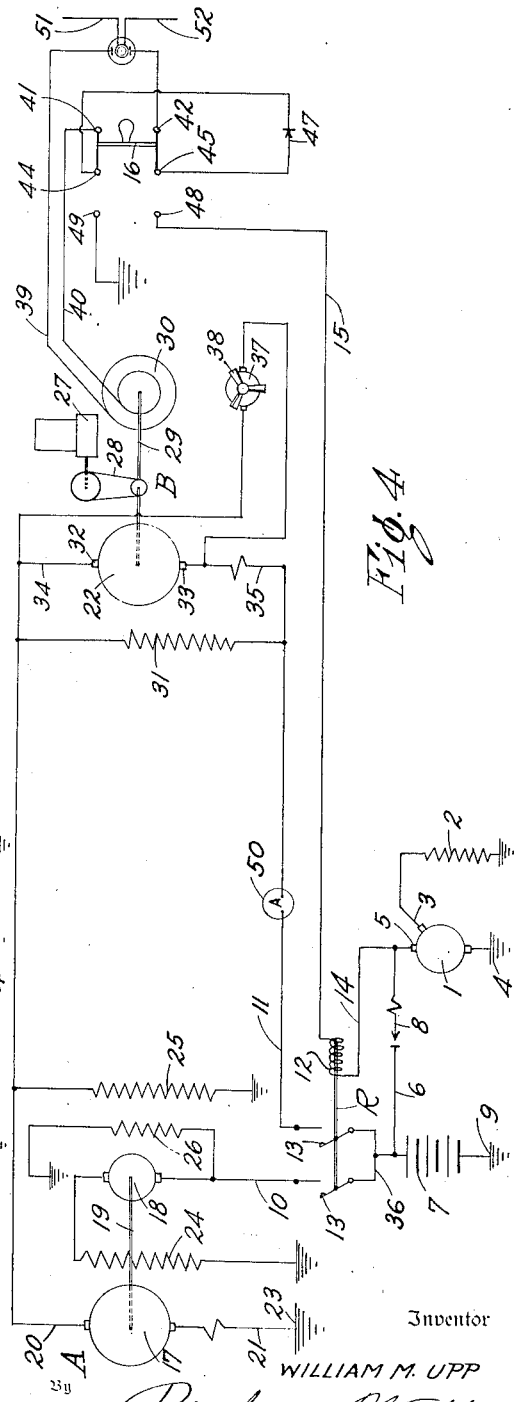

Patented Aug. 10, 1937

2,089,512

UNITED STATES PATENT OFFICE 2,089,512

ELECTRICAL SYSTEM FOR TRUCK REFRIGERATION AND THE LIKE

William M. Upp, Kansas City, Mo., assignor to Whitaker-Upp Company, Kansas City, Mo., a corporation of Delaware Applicatin May 2, 1935, Serial No. 19,463

6 Claims. (Cl. 172—239)

This invention relates to improved electrical systems for automotive vehicles having refrigerated chambers or compartments which are kept at the desired temperature by means of electrical refrigeration apparatus, preferably of the compression type.

In my United States Letters Patent No. 1,991,070 which issued February 12, 1935, I have described and claimed an improved electrical distribution system for use in connection with automotive vehicles for supplying a constant voltage current adapted to operate electrical refrigeration apparatus or the like. The present invention is directed to the same general type of apparatus in which means are provided for generating a substantially constant voltage current regardless of the speed of the vehicle whereby the motor which operates the compressor of the refrigeration system can be most efficiently and economically operated.

In my co-pending United States patent application Serial No. 150,370 filed June 25, 1937, I have specifically claimed the constant voltage generator disclosed herein and cross-reference is hereby made to said co-pending application.

It is among the objects of my invention to provide an electrical system for refrigerated automotive vehicles which can readily be installed on ordinary trucks and which utilizes the standard truck battery and generator to assist in the proper operation of the refrigeration unit.

Other objects of my invention are: the provision of a refrigeration system for an automotive vehicle which will operate continuously and automatically to maintain the desired temperature conditions within the refrigerated chamber regardless of the variation in outside temperature; the provision of a truck refrigeration system which may be operated from a standard power line, for example 110 or 220 volt alternating current, when the truck is standing still for relatively long periods of time; the provision of a refrigeration system for automotive vehicles in which the temperature in the refrigerated chamber or compartment is controlled automatically at all times by a thermostat regardless of whether the system is operated by current generated on the truck itself or by current from an outside source; the provision of an electrical system for refrigerated trucks in which the auxiliary electrical equipment is interconnected with the regular truck generator and battery so that at times current is taken from the truck generator and battery and at other times a charging current is delivered to the battery thus relieving the load on the main truck generator; the provision of an improved type of generator and electrical connections therefor whereby a substantially constant voltage current can be obtained over a considerable range of speed of the vehicle; and the provision of means for maintaining a circulation of air in the refrigerated compartment of the vehicle which means are operable regardless of whether the refrigerating current supply is developed by the apparatus on the truck or is taken from an outside source, such as a city power line.

The above and other objects of my invention will appear from the following description of one embodiment thereof, reference being had to the accompanying drawings which diagrammatically illustrate my preferred circuit and arrangement of apparatus. The installation of the different parts of my apparatus on an automotive vehicle has not been illustrated as it will be understood by those skilled in the art that the various motors, generators, etc., will be located on the vehicle in the most convenient and accessible places and that such locations will vary depending on the type of vehicle and the specific purposes of the particular installation.

Figure 1 is a diagrammatic layout illustrating my improved apparatus and circuit arrangement and showing the electrical connections which exist when the vehicle engine is operating at very low speed.

Figure 2 is a diagrammatic layout similar to Figure 1 but illustrating the electrical connections which are made when the vehicle engine is operating at moderately low speed.

Figure 3 is a view similar to Figures 1 and 2 but illustrating the electrical connections which are made when the vehicle engine is operating at normal speed and all of the refrigerating current is being developed by the generating apparatus on the vehicle.

Figure 4 is a view of the system illustrated in Figures 1, 2, and 3 but showing the electrical connections which are effective when the vehicle is standing still and current is supplied to the refrigeration apparatus from an outside source.

Referring now to Figure 1 the elements of my apparatus and electrical connections therebetween will be described.

The main truck generator 1 is preferably driven directly from the vehicle engine in any suitable manner (not shown) and is provided with a shunt field 2 which is connected to the generator commutator through the third brush 3. One of the generator brushes may be grounded as at 4 and the other is connected through the wires 5 and 6 to the usual storage battery 7. A cut-out 8 is interposed in line 6 and serves to disconnect the generator 1 from the battery 7 until the generator reaches a speed sufficient to charge the battery. One side of the battery is grounded at 9 and the other side is connected through the relay R to the wires 10 and 11. The relay R is adapted to make and break the connections between the battery 7 and the wires 10 and 11 and may be of any suitable type. As illustrated this relay switch includes the solenoid 12 which is connected to operate the switch arms 13. When the solenoid 12 is energized to a sufficient degree the relay will be moved from the position shown in Figure 1 to that shown in Figure 2. A suitable spring (not shown) may return the arms 13 when the solenoid is not sufficiently energized to maintain the switch closed. The solenoid 12 is connected to one side of the output of the main truck generator 1 by the wire 14 and the other end of the solenoid coil is connected by a wire 15 to one pole of the double pole, double throw switch 16.

The auxiliary generator generally indicated at A is of the voltage regulator type and comprises a main high voltage direct current armature 17 and a low voltage direct current regulator armature 18. The armatures 17 and 18 are mounted on the same shaft 19 which is suitably connected through driving gears or the like (not shown) to the vehicle engine (not shown). The output of the main high voltage generator 17 is delivered through the wires 20 and 21 which lead to the direct current compressor operating motor 22 and to the ground at 23 respectively. The high voltage generator 17 is separately excited by the field 24 which is arranged in series with the low voltage generator armature 18 and the battery 7. As will be more fully described later, the low voltage armature or generator 18 is so arranged that its voltage usually opposes the current flow through the field 24 of high voltage generator 17 from the battery 7. In this way the generator 18 acts as a regulator because as the speed of the generator unit A increases, the voltage output of the regulator increases. This in turn, due to its opposing relation, automatically reduces the strength of the field 24. The coils, etc. are so designed that this reduction in the field current of the high voltage generator 17 will offset the tendency of this generator 17 to increase its voltage due to the increase in its speed of rotation. The main field 25 of the voltage regulator generator 18 is connected across the terminals of the high voltage generator 17 so that any increase in the voltage delivered to the line 20—21 by the generator 17, due to increased generator speed, will also increase the current in the regulator field 25. This increases the potential delivered by the regulator generator 18 and in turn reduces the field current of the high voltage generator 17 thus preventing further increase in the line voltage 20—21 which would otherwise result from the increase in speed of the unit.

At low speeds the bucking or opposing action of the regulator generator 18 is reduced by the action of the auxiliary field 26. This field is connected across the battery 7 and, when the relay switch R is closed, the battery delivers practically a constant current to the field 26 which is connected to oppose the main regulator field 25. When the vehicle speed is very low the rate of rotation of the generator is correspondingly low. The voltage from the generator 17 may be so low that the auxiliary regulator field 26 will overpower the main regulator field 25. The polarity of the output of the crusher generator 18 will then be reversed so as to aid and increase the excitation of the field 24 of the high voltage generator 17.

It will be seen by those skilled in the art that by proper design of the three fields, 24, 25 and 26 a constant voltage can be obtained from the generator 17 and delivered to the line 20—21 throughout a wide range of speed. This constant voltage operation is especially important in electrical refrigeration work where it is advantageous to drive the refrigeration generator at approximately a constant speed regardless of the speed of the vehicle or vehicle engine.

The compressor of the refrigeration unit is diagrammatically indicated at 27 and may be driven by a belt 28 from the shaft 29. The dual-motor indicated at B consists of a direct current motor 22 and an alternating current motor 30 both mounted on or connected to the shaft 29. In my preferred embodiment the high voltage direct current generator 17 is designed to deliver 110 volts and the alternating current motor 30 may be designed to operate on any of the standard commercial voltages, for example 110 or 220 volts.

The direct current motor 22 is provided with a shunt field 31 which is connected across the brushes 32 and 33. The brush 32 is connected to the line 20 from the generator 17 through the wire 34. The brush 33 is connected to the other side of the generator 17 through the wire 35, the wire 11, the relay switch arm 13, the wire 36, battery 7 and through the ground to the wire 21. Another path for the return circuit from the motor 22 to the generator 17 is through the wire 35, the relay arm 13, the wire 10, the crusher generator 18, the field 17 and through the ground to the wire 21.

The motor 37 which drives the fan 38 for giving the desired circulation of air in the refrigerated compartment is connected across the brushes 32 and 33 of the direct current motor 33 and it derives current from the generator 17 when the vehicle is moving and the refrigeration apparatus is operating. The brushes of the alternating current motor 30 are connected through the lines 39 and 40 to the poles 41 and 42 of the switch 16. A standard outlet connection 43 is inserted in the line 39. The center poles 44 and 45 of the switch 16 are connected to each other through the wire 46 in which is interposed a thermostatically operated switch 47 which is disposed within the refrigerated compartment and is designed to maintain the temperature in this chamber at the desired point in a manner to be later described. The poles 48 and 49 of the switch 16 are connected to the wire 15 and the ground respectively. An ammeter 50 may be inserted in the line 11 and located on the vehicle dash, or other convenient place, to indicate operation or non-operation of the refrigeration equipment. It will be understood that suitable overload relays or fuses may be inserted in the electrical connections in a well known manner where desirable in order to protect the refrigeration equipment in case of extreme overloads and such safety devices may be arranged to be effective regardless of whether the device is operated from the generator unit A or from the line current supplied through the power lines 51 and 52 (Fig. 4). These wires 51 and 52 are connected to the usual type plug which is inserted in the outlet or socket 43 when it is desired to operate the apparatus from the city current when the vehicle is standing still.

Having described the various elements of my apparatus and the electrical connections therebetween I will now describe the operation thereof under several different conditions.

In Figure 1 the switch 16 is in its left hand or direct current position and the thermostat circuit 46 is connected through switch 16 to the poles 48 and 49 of the switch. This is the position in which the switch 16 is normally maintained when the vehicle is in motion and it is desired to operate the refrigeration equipment. In Figure 1 the connections are shown which will obtain when the vehicle and/or its engine is running very slowly and the generator 1 is rotating at such a low rate that its voltage output is below that necessary to charge the battery 7 (for instance below 5 volts) and the coil 12 of the relay R will not receive sufficient current to enable it to close the contact members 13. When the relay R is open as shown in Figure 1, the battery 7 is completely disconnected from the refrigeration equipment and excessive current drain from the battery is prevented. When the relay R is open the circuit to the direct current motor 22 will also be broken and therefore this motor cannot be operated to drive the refrigerator compressor 27 and no refrigerating effect can be obtained.

In Figure 2 the parts are shown in the positions they assume when the speed of the vehicle has risen to the point where the voltage of the truck generator 1 is just sufficient to close the relay R. Under these conditions the truck generator cut-out 8 will also be closed and the generator 1 will be supplying a charging current to the battery 7. The field 24 of the high voltage generator 17 is energized from the battery 7 and, as the circuit to the motor 22 is closed and the thermostat 47 is closed, the motor 22 will drive the compressor 27.

Under these conditions of relatively low speed it is desirable to obtain as high a voltage from the generator 17 as is possible. The main regulator generator field 25 is relatively weak due to the slow speed of generator 17, the auxiliary regulator field 26 is normal, being energized by the battery 7, and over-powers the main regulator field 25. This causes the polarity of the output of the regulator generator 18 to be such as to aid or increase the current flowing from the battery 7 to the field 24 of the high voltage generator 17. This action, of course, tends to increase the voltage delivered by the high voltage generator 17 and supplied to the motor 22. As the fan motor 27 is connected across the armature of the motor 22 this motor will operate as long as the motor 22 is in operation.

In Figure 3 the parts are in the positions which they assume when the truck is operating at normal speed, i. e. from say approximately 15 to 50 miles per hour. As the speed of the vehicle engine increases the speed of the generator 17 will also increase and the tendency will be for the voltage generated thereby to rise. The current through the field 25 of the regulator 18 will also increase as the speed of the shaft 19 increases and will reach such a value that it will overpower the auxiliary regulator field 26. The polarity of the regulator generator 18 will then be reversed over that of the connections shown in Figure 2 and described above and its output will act to oppose and reduce the current flowing through the field 24 of the high voltage generator 17. This action will offset the tendency of the voltage output of the high voltage generator 17 to rise, or at least will hold any increase in voltage within the desired limitations.

It will be understood that at any time during the above described operation of my apparatus the temperature within the refrigerated compartment may have become lowered to the desired degree. When this occurs the thermostat 47, which is disposed in the refrigerated compartment, will act to open its contacts. This will break the circuit to the coil 12 of the relay R and cause the relay R to instantly open its contacts which in turn opens the line to the motor 22 and breaks the circuit to the field 24 of the high voltage generator 17. All action of the equipment is thus suspended until the temperature in the refrigerated compartment rises to a point where the thermostatic switch 47 will again close its contacts.

In Figure 4 I have illustrated the circuit arrangement when the truck is standing still and the alternating current supply socket 43 has been connected to a suitable power line 51—52. Before the outside connection is made the switch 16 is moved into its right hand position, as seen in Figure 4, whereby the switch pole 42 is connected to the switch pole 41 through the wire 46 and the thermostatic control switch 47. The thermostat 47 is still effective to control the operation of the refrigeration apparatus. When the thermostat 47 is closed the line 51—52 is directly connected to the alternating current motor 30 and said motor 30 will rotate, driving the shaft 29 and the armature of the direct current motor 22. The refrigeration compressor 27 will also be driven due to its mechanical connection to the shaft 29 through the belt 28. The motor 22 now becomes a generator and its output is delivered to the motor 37 which rotates and drives the fan 38 to give the desired circulation of air within the refrigeration compartment.

It will be seen from the above description that I have provided an extremely flexible electrical system for refrigerated motor trucks and the like which is adapted to be controlled by a single switch 16 and which may be operated from a commercial line current when the truck is standing still. Due to my improved circuit arrangement and use of the control relay R the most satisfactory operation is obtained at all truck speeds. Moreover, the vehicle battery is protected from harmful current drain and is also adapted to be charged both by the usual truck generator 1 and by the return current from the high voltage generator 17.

Although I have fully described only one particular embodiment of my invention it will be understood by those skilled in the art that modifications and variations may be made in the circuit and apparatus which I have shown and described without departing from the spirit of my invention. I do not, therefore, wish to be limited to the exact forms herein specifically referred to but claim as my invention all embodiments thereof coming within the scope of the appended claims.

I claim:

1. In an electrical system for motor vehicles and the like, a main vehicle generator connected to be driven by the vehicle engine, a storage battery, an auxiliary high voltage generator, means for causing said high voltage generator to deliver a substantially constant voltage current throughout a wide range of speed, said high voltage generator being driven from the vehicle engine and having a field coil connected to be energized by said storage battery, a motor connected to receive current from said auxiliary high voltage generator, and a relay energized by current from said main vehicle generator for controlling the connections from said battery to the field of said high voltage generator and from said high voltage generator to said motor.

2. In an electrical system for motor vehicles and the like, a main vehicle generator connected to be driven by the vehicle engine and adapted to deliver a current which varies with the engine speed, a storage battery, an auxiliary high voltage generator, means for causing said high voltage generator to deliver a substantially constant voltage current throughout a wide range of speed, said high voltage generator being driven from the vehicle engine and having a field coil connected to be energized by said storage battery, a motor connected to receive current from said auxiliary high voltage generator, and a relay energized by current from said main vehicle generator for controlling the connections from said battery to the field of said high voltage generator and from said high voltage generator to said motor, said relay being adapted to make and break said connections at predetermined engine speeds.

3. In an electrical system for motor vehicles and the like, a main vehicle generator connected to be driven by the vehicle engine, a storage battery, an auxiliary high voltage generator, said high voltage generator including a main armature and a regulator armature, said regulator armature having two field coils connected in opposition to each other whereby the voltage from the regulator armature will increase the field current for the main armature of said high voltage generator during a part of the speed range thereof and will oppose and reduce the field current for the main armature of the high voltage generator during another part of the speed range thereof, said high voltage generator being driven from the vehicle engine and having the field for its said main armature connected to be energized by said storage battery, a motor connected to receive current from said auxiliary high voltage generator, and a relay energized by current from said main vehicle generator for controlling the connections from said battery to the field of said high voltage generator and from said high voltage generator to said motor.

4. In an electrical system for motor vehicles and the like, a low voltage generator connected to be driven by the vehicle engine, a high voltage generator connected to be driven by the vehicle engine, a motor connected to receive current from said high voltage generator, and means responsive to current from said low voltage generator for controlling the electrical connections from said high voltage generator to said motor.

5. In an electrical system for motor vehicles and the like, a low voltage generator connected to be driven by the vehicle engine and adapted to deliver a current varying with changes in engine speed, a storage battery, a high voltage generator, means for causing said high voltage generator to deliver a substantially constant voltage current throughout a predetermined range of speed, said high voltage generator having a field coil connected to be energized by said storage battery, a motor connected to receive current from said high voltage generator, and means responsive to current from said low voltage generator for controlling the connections from said battery to the field of said high voltage generator.

6. In an electrical system for motor vehicles and the like, a main vehicle generator connected to be driven by the vehicle engine, a storage battery, an auxiliary generator, said auxiliary generator being driven from the vehicle engine and having a field coil connected to be energized by said storage battery and means responsive to current from said main vehicle generator for controlling the connections from said battery to the field of said auxiliary generator.

WILLIAM M. UPP.